United States Patent
Li et al.

(10) Patent No.: US 10,838,171 B1
(45) Date of Patent: Nov. 17, 2020

(54) ANAMORPHIC LENS

(71) Applicant: GUANGDONG SIRUI OPTICAL CO., LTD., Zhongshan (CN)

(72) Inventors: Jie Li, Zhongshan (CN); Wei Wu, Zhongshan (CN); Wulin Li, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 0 days.

(21) Appl. No.: 16/888,546

(22) Filed: May 29, 2020

Related U.S. Application Data

(63) Continuation of application No. 16/753,399, filed as application No. PCT/CN2019/108977 on Sep. 29, 2019.

(30) Foreign Application Priority Data

Sep. 26, 2019 (CN) .......................... 2019 1 0916059

(51) Int. Cl.
  *G02B 13/00* (2006.01)
  *G02B 3/06* (2006.01)
  *G02B 13/08* (2006.01)
(52) U.S. Cl.
  CPC ............. *G02B 13/003* (2013.01); *G02B 3/06* (2013.01); *G02B 13/006* (2013.01); *G02B 13/08* (2013.01)

(58) Field of Classification Search
  CPC ..... G02B 13/08; G02B 13/12; G02B 27/0911
  See application file for complete search history.

(56) References Cited

U.S. PATENT DOCUMENTS

| 5,930,050 A | 7/1999 | Dewald |
| 6,512,636 B2 * | 1/2003 | Schauss ................ G02B 13/08 359/668 |
| 2016/0170173 A1 | 6/2016 | Macintosh et al. |
| 2017/0192210 A1 | 7/2017 | Sasaki et al. |

FOREIGN PATENT DOCUMENTS

| CN | 102540413 A | 7/2012 |
| CN | 107479173 A | 12/2017 |

* cited by examiner

*Primary Examiner* — Robert E. Tallman
(74) *Attorney, Agent, or Firm* — Loeb & Loeb LLP

(57) ABSTRACT

An anamorphic lens includes a cylindrical lens group arranged in a direction from an object side to an image side. The cylindrical lens group includes an anamorphic group and together form an imaging group. The anamorphic group includes a first lens, a second lens, and a third lens arranged in a direction of an object side to an image side. The second lens and the third lens may be joined together and the first lens may be a negative optical power biconcave cylindrical lens. Through the optical characteristics of the cylindrical lens in the anamorphic group, the entering horizontal light is compressed while the vertical light path maintains unchanged. The imaging group comprehensively corrects the light so that the horizontal field of view angle is increased by about 33% to achieve a magnification by 1.33 times for an anamorphic shooting.

12 Claims, 2 Drawing Sheets

ANAMORPHIC LENS

CROSS-REFERENCE TO RELATED APPLICATIONS

This is a continuation application that claims priority to U.S. Nonprovisional application Ser. No. 16/753,399, filed on Apr. 3, 2020, which is a US national stage application of PCT/CN2019/180977, filed on Sep. 29, 2019, which claims priority to a Chinese application number 201910916059.8, filed on Sep. 26, 2019. The present application also claims priority to a US design application Ser. No. 29/729,658, filed on Mar. 29, 2020, which claims priority to a Chinese design application 201930656498.2, filed on Nov. 22, 2019. All these applications are incorporated by reference in their entirety herein.

TECHNICAL FIELD

The present invention relates generally to the field of lens technology, and in particular, to an anamorphic lens.

BACKGROUND

With the rapid development of web technology, taking photos and videos has become essential part for ordinary consumers. With the promotion of 5G and other technologies in recent years, more and more video sharing such as Vlog has been used. More individuals shoot short films and micro movies with mobile phones, cameras and other tools.

However, the current normal shooting screen ratio of mobile phones, tablets, cameras and other devices on the market is 16:9, but the cinematic widescreen video ratio is 2.4:1. Therefore, users need to manually edit or digitally cropping method to edit the captured images or videos. However, the pixels of the pictures are sacrificed during cropping or editing.

Some professional anamorphic lens brands such as, Hawk from Germany, Cooke from Great Britain, ARRI from Germany, Panavision from the USA, Angenieux from France and SLR from Hong Kong are usually tailored for professional customers. The prices of these film equipment are generally over tens of thousands of dollars or even more expensive, and anamorphic lenses themselves weighs several kilograms.

Expensive and quality professional anamorphic lenses are not suitable for ordinary users. Therefore, how to reduce the size of anamorphic lens and reducing the weight of the lens are technical problems that are to be solved at present embodiments of the invention.

SUMMARY

Therefore, embodiments of the invention attempt technically solve shortcomings in the professional anamorphic lens where the quality is great but at a cost that ordinary consumers could not afford. Aspects of the invention provide an anamorphic lens that solve the technical problem with the following embodiments:

An anamorphic lens may include cylindrical lens group in an arrangement of an object side to an image side. The cylindrical lens group may include an anamorphic group of cylindrical lenses and an imaging group having spherical lenses. The anamorphic group may include a first lens, a second lens and a third lens in a sequential order from the object side to the image side. The second lens may be a negative optical power cylindrical lens and the third lens may be a positive optical power cylindrical lens.

In one embodiment, the first lens may be a negative optical power biconcave cylindrical lens.

In another embodiment, the second lens and the third lens may be joined together.

The imaging group in a direction of light toward the image side may dispose a fourth lens, a fifth lens, a sixth lens, a seventh lens, an eighth lens, a ninth lens, and a tenth lens. In one embodiment, the fourth lens may be a positive optical power meniscus spherical lens; the fifth and eighth lenses may be positive optical power; the sixth lens and the seventh lens may be negative optical power spherical lenses; the ninth lens may be a positive power biconvex spherical lens, and the tenth lens may be a positive power meniscus spherical lens.

In one embodiment, the fifth lens and the sixth lens may be joined together. In such an arrangement, the fifth lens may be a positive optical power, and the sixth lens may be a negative optical power lens.

In one embodiment, the fifth lens and the sixth lens may be independent of each other. In such an arrangement, the fifth lens may be a positive optical power meniscus lens, the sixth lens may be a negative optical power meniscus lens. In one embodiment, the concave surfaces of the fifth lens and the sixth lens may be disposed toward the image side.

In one embodiment, the power distribution of the lenses constituting the anamorphic group and the lenses constituting the imaging group may possess the following relationship:

$$500 < \text{abs}(f_{1-3}/f_{4-10});$$

$$45 < f_{4-10} < 55;$$

$$1.60 < f_{4-6}/f_{4-10} < 2.10;$$

$$0.60 < f_{7-10}/f_{4-10} < 0.80;$$

In another embodiment, the power distribution of the lenses constituting the anamorphic group and the lenses constituting the imaging group may also possess the following relationship:

$$1.10 < \text{abs}(f_1/f_{2-10}) < 1.40;$$

$$-0.80 < f_1/f_{2-3} < -0.70;$$

$$0.50 < f_4/f_{4-6} < 0.80;$$

$$1.0 < f_{9-10}/f_{7-10} < 1.60;$$

$$5.0 < \text{abs}(f_{7-8}/f_{7-10}) < 9.0;$$

Where, f may represent a focal length of the lens in X direction, where the subscript number of f represents a number of the ten lenses of the anamorphic lens. For example, $f_1$ may be the focal length in the X direction of the first lens, and $f_{1-10}$ may be the combined focal length of the first to 10th lenses in the X direction of ten lenses, and so on.

In yet another embodiment, the length of the anamorphic lens may be less than 105 mm, and the large outer diameter of the anamorphic lens may be less than 70 mm.

In a further embodiment, the focal length in the Y direction of the anamorphic lens may be 50 mm, and the aperture may be an f-stop of 1.8.

In a further embodiment, the mass of the anamorphic lens may be less than 600 g.

The technical solution of the present invention may include the following advantages:

1. An anamorphic lens as provided by embodiments of the present invention may include a cylindrical lens arranged from the object side to the image side as an anamorphic group and an imaging group including spherical lenses. The anamorphic group may include a first lens, a second lens, and a third lens that are disposed in a sequential order, and the second lens and the third lens may be joined together. The first lens may be a negative optical power biconcave cylindrical lens, the second lens may be a positive optical power cylindrical lens and the third lens may be a positive optical power cylindrical lens.

Use the optical characteristics of the cylindrical lenses in the anamorphic group to "compress" the horizontally entering light while the light entering in the vertical direction remains unchanged, the imaging group thereafter may comprehensively correct the light passing therethrough. Such aspects may increase the angle of field of view for the horizontal shooting of the lens, which may increase the width the field of the actual shot or filming. Aspects of the invention no longer need post-processing or editing of the images or films, so that users may still obtain a ratio of 2.4:1 for a widescreen video or photos without sacrificing pixels as a result of the editing. At the same time, because the anamorphic group may be include a cylindrical lens, the anamorphic lens of embodiments of the invention may further include an oval shaped out-of-focus flare, sci-fi line flare, and other optical characteristics in addition to the anamorphic function.

2. The anamorphic lens as provided by embodiments of the present invention may include the power distribution relationship of the lens in the anamorphic group, and the lens in the imaging group:

$500 < \mathrm{abs}(f_{1-3}/f_{4-10})$; $45 < f_{4-10} < 55$; $1.60 < f_{4-6}/f_{4-10} < 2.10$; $0.60 < f_{7-10}/f_{4-10} < 0.80$; $1.10 < \mathrm{abs}(f_1/f_{2-10}) < 1.40$; $-0.80 < f_1/f_{2-3} < -0.70$; $0.50 < f_4/f_{4-6} < 0.80$; $3.0 < f_{10}/f_{7-10} < 4.50$; $1.10 < \mathrm{abs}(f_{2-10}/f_{1-10}) < 1.60$; where, f may represent a focal length of the lens in X direction, where the subscript number of f represents a number of the ten lenses of the anamorphic lens. For example, $f_1$ may be the focal length in the X direction of the first lens, and $f_{1-10}$ may be the combined focal length of the first to 10th lenses in the X direction of ten lenses, and so on.

Embodiments of the invention may increase the field of view of 50 mm f/stop of 1.8 half-frame lens horizontally by 33%, while the vertical field of view may remain the same, resulting in a smaller sized 50 mm large aperture anamorphic lens.

DESCRIPTION OF THE DRAWINGS

In order to more clearly illustrate the specific embodiments of the present invention or the technical solutions in the prior art, the drawings needed to be used in embodiments or the description of the prior art are briefly introduced below. Obviously, the drawings in the following are some embodiments of the present invention. For those of ordinary skill in the art, other drawings may be obtained based on these drawings without undue creative labor.

Figure 1:
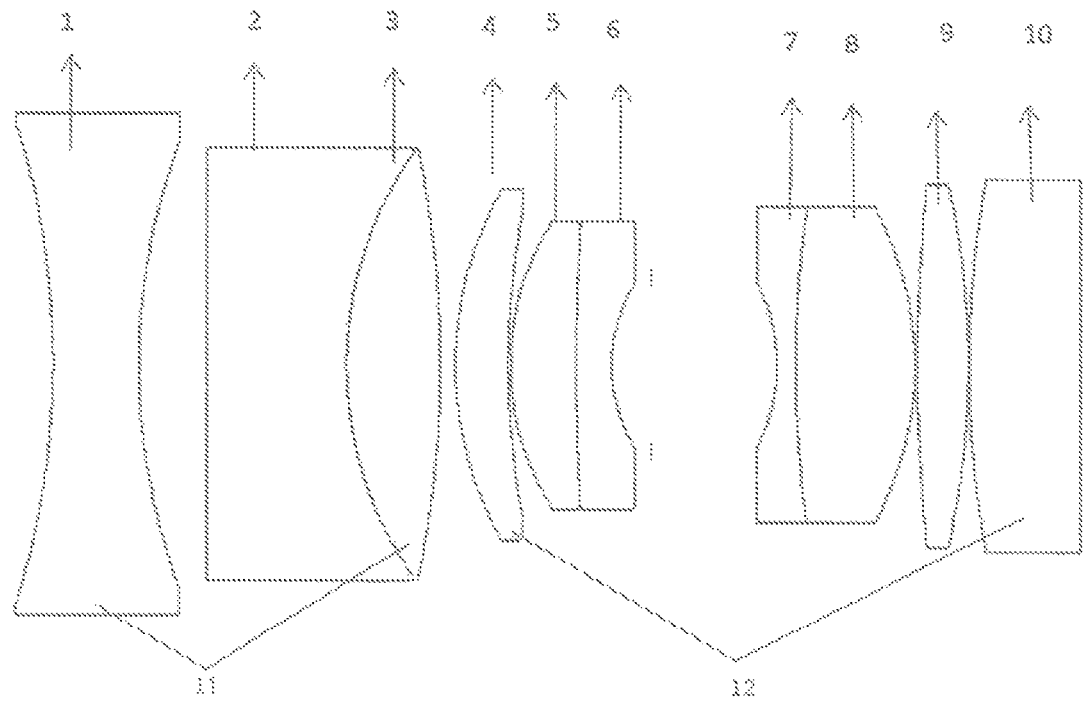
FIG. 1 is an optical structure diagram in an X direction according to a first embodiment of the present invention.

The following lists the labels for the reference numbers:
1—first lens; 2—second lens; 3—third lens; 4—fourth lens; 5—fifth lens; 6—sixth lens; 7—seventh lens; 8—eighth lens; 9—ninth lens; 10—tenth lens; 11—anamorphic group lens; 12—imaging group.

DETAILED DESCRIPTION

The technical solution of the present invention may be clearly and completely described below with reference to the accompanying drawings. Obviously, the described embodiments may be part of the present invention, but not all of them. Based on the embodiments of the present invention, all other embodiments obtained by a person of ordinary skill in the art without creative efforts shall fall within the protection scope of the present invention.

In the description of the present invention, it is noted that the terms "center", "up", "down", "left", "right", "vertical", "horizontal", "inside", "outside", etc., are meant to indicate orientation or positional relationship and they may be based on the orientation or positional relationship shown in the drawings, and may only be for the convenience of describing the present invention and simplified description, and does not indicate or imply that the device or element referred to must have a specific orientation, a specific construction and operation as they are not be construed as limiting the invention. In addition, the terms "first," "second," and "third" may be used for descriptive purposes only, and should not be construed to indicate or imply relative importance.

In the description of embodiments of the present invention, it is noted that the terms "installation", "connected", and "connected" should be understood in a broad sense unless otherwise specified and limited. For example, they may be fixed connections or removable, connected or integrated; it may be mechanical or electrical; it may be directly connected, or it may be indirectly connected through an intermediate medium, or it may be the internal communication of two elements. For those of ordinary skill in the art, the specific meanings of the above terms of embodiments of the present invention may be understood in a case-by-case basis.

In addition, the technical features involved in the different embodiments of the present invention described below may be combined with each other as long as they do not conflict with each other.

Example 1

Figure 2:
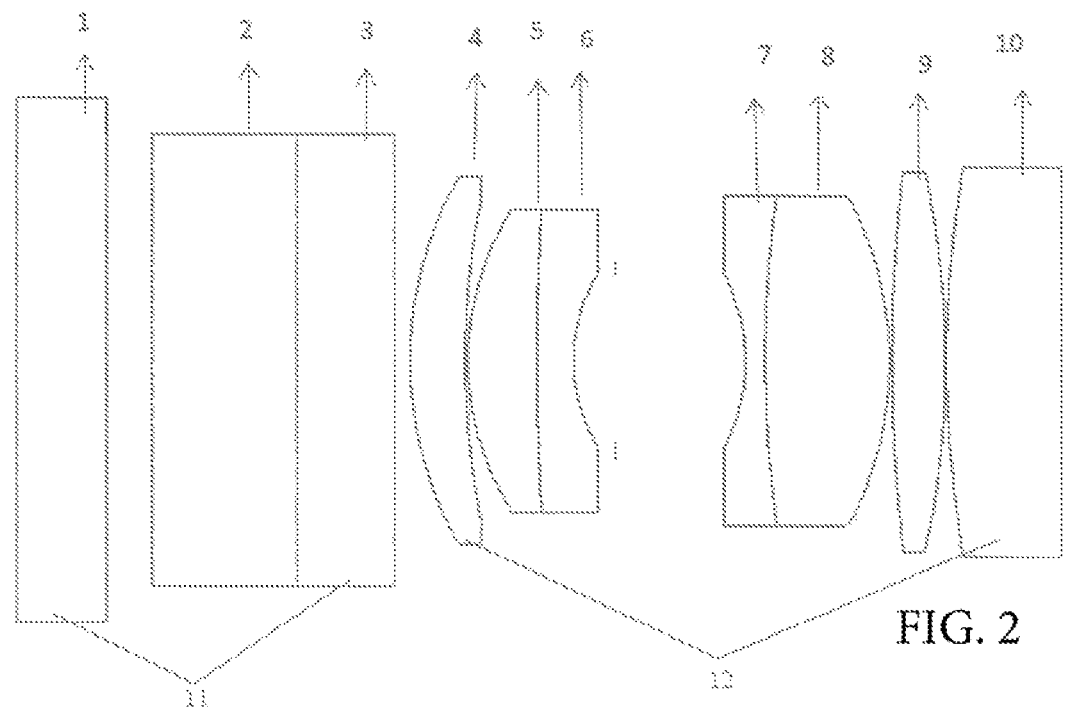
FIG. 2 is an optical structure diagram in an Y direction according to a first embodiment of the present invention.

As shown in FIG. 1 and FIG. 2, one embodiment may include a 50 mm half-frame large aperture anamorphic lens. In one embodiment, the lens described below may be transparent lens. The anamorphic lens may include ten lenses arranged along the optical path from an object side to an image side, which may include a first lens 1, a second lens 2, a third lens 3, a fourth lens 4, a fifth lens 5, a sixth lens 6, a seventh lens 7, an eighth lens 8, a ninth lens 9, and a tenth lens 10.

In one embodiment, the first lens 1, the second lens 2, and the third lens 3 may be cylindrical lenses. The second lens 2 and the third lens 3 may be joined together. Together with the first lens 1 to form an anamorphic group 11. The fourth lens 4, the fifth lens 5, the sixth lens 6, the seventh lens 7, the eighth lens 8, the ninth lens 9, and the tenth lens 10—these seven lenses—in one embodiment, may be spherical lens. The fifth lens 5 and the sixth lens 6 may be joined together, and the seventh lens 7 and the eighth lens 8 may be joined together. These seven lenses may form an imaging group 12.

In one embodiment, the first lens 1 may be a negative optical power biconcave cylindrical lens. The second lens 2 may be a negative cylindrical lens, and the third lens 3 may be a positive optical power cylindrical lens. The fourth lens 4 may be a positive optical power meniscus spherical lens, and a concave surface of the fourth lens 4 is disposed toward the image side.

In a further embodiment, the fifth lens 5 may be a positive optical power spherical lens. The sixth lens 6 and the seventh lens 7 may be negative optical power spherical lenses. The ninth lens 9 may be a positive optical power biconvex spherical lens. The tenth lens 10 may be a positive optical power meniscus spherical lens, and the convex surface of the tenth lens may be convex\toward the object side.

In one embodiment, the lenses may be joined together as a unit. In this embodiment, the second lens 2 and the third lens 3 may be joined together. The fifth lens 5 and the sixth lens 6 may be joined together, and the seventh lens 7 and the eighth lens 8 may be joined together. Therefore, the anamorphic lens of this embodiment may comprise 10 elements and 7 groups.

In a further embodiment, the combinations of the second lens 2 and the third lens 3, the sixth lens 6 and the seventh lens 7, and the eighth lens 8 and the ninth lens 9 are not specific limitation. For example, in this Example, the joining method may be via bonding. As an alternative embodiment, based on the spirit and scope of the present invention, in order to distinguish it from embodiments of the present application, the above-mentioned combination methods may be modified, such as lamination, gluing, integrated molding, or the like. After such bonding, the shape of the composite or combined lens may then be appropriately adjusted according to the above examples. Therefore, these alternative approaches may also be within the scope and spirit of the invention.

In a further embodiment, the Example may provide that the fourth lens 4 in the imaging group may be an independent lens. As an alternative embodiment, the fourth lens 4 may be split to two, multiple lenses or use two or multiple lenses joined together as a replacement. When replacing the fourth lens 4, as long as the replacement lens satisfy the optical power relationship, for example, "$0.60 < f_4/f_{4-6} < 0.90$". Therefore, on the basis of the Example, any attempt to distinguish over the present invention by replacing lenses based on the number of lenses or a combination thereof are within the conception of the present application and should still fall within the spring and scope of the present invention.

In a further embodiment, the Example may provide that the fifth lens 5 and the sixth lens 6 be joined together. As an alternative embodiment, the fifth lens 5 and the sixth lens 6 may be split into two or more independent lenses. In yet another embodiment, the joined lenses of the fifth lens 5 and the sixth lens 6 may be replaced with a single lens. Therefore, on the basis of the Example, any attempt to distinguish over the present invention by replacing the fifth lens 5 and the sixth lens 6, regardless of whether the lens type or shape has changed, or it is an independent lens or a combined lens, as long as the replacement lens satisfy the optical power relationship, for example, "$0.60 < f_4/f_{4-6} < 0.90$," then such replacement still falls within the spring and scope of the present invention.

In a further embodiment, the Example may provide that the seventh lens 7 and the eighth lens 8 be joined together. As an alternative embodiment, the seventh lens 7 and the eighth lens 8 may be split into two or more independent lenses. In yet another embodiment, the joined lenses of the fifth lens 5 and the sixth lens 6 may be replaced with a single lens. Therefore, on the basis of the Example, any attempt to distinguish over the present invention by replacing the fifth lens 5 and the sixth lens 6, regardless of whether the lens type or shape has changed, or it is an independent lens or a combined lens, as long as the replacement lens satisfy the optical power relationship, for example, "$5.0 < \mathrm{abs}(f_{7-8}/f_{7-10}) < 9.0$," then such replacement still falls within the spring and scope of the present invention.

In a further embodiment, the Example may provide that the ninth lens 9 and the tenth lens 10 be independent of each other. In one embodiment, the ninth lens 9 and the tenth lens 10 may satisfy an optical power relationship of "$1.0 < f_{9-10}/f_{7-10} < 1.60$". Therefore, on the basis of the Example, any attempt to replace the ninth lens 9, the tenth lens 10 with a composite lens with multiple lenses joined together, a single lens, regardless of whether the lens type or shape has changed, or through a combination to modify it, still falls within the spring and scope of the present invention.

In one embodiment, specific numerical values of the actual parameters of each lens are not specifically limited. In this embodiment, the power of each lens or lens group may satisfy the following mathematical relationship:

$$500 < \mathrm{abs}(f_{1-3}/f_{4-10});$$

$$45 < f_{4-10} < 55;$$

$$1.60 < f_{4-6}/f_{4-10} < 2.10;$$

$$0.60 < f_{7-10}/f_{4-10} < 0.80;$$

each lens's optical power further may satisfy the following mathematical relationship;

$$1.10 < \mathrm{abs}(f_1/f_{2-10}) < 1.40;$$

$$-0.80 < f_1/f_{2-3} < -0.70;$$

$$0.60 < f_4/f_{4-6} < 0.90;$$

$$1.0 < f_{9-10}/f_{7-10} < 1.60;$$

$$5.0 < \mathrm{abs}(f_{7-8}/f_{7-10}) < 9.0;$$

Where, f may represent a focal length of the lens in X direction (e.g., horizontal direction), where the subscript number of f represents a number of the ten lenses of the anamorphic lens. For example, $f_1$ may be the focal length in the X direction of the first lens, and $f_{1-10}$ may be the combined focal length of the first to 10th lenses in the X direction of ten lenses, and so on.

The following table may The actual parameters of each lens of this embodiment that meet the above mathematical relationship are listed below:

| Lens | Surface Shape | radius (mm) | Thickness (mm) | Refractive index | Abbe Number | Mass (g) |
|---|---|---|---|---|---|---|
| First lens | Cylindrical | −68.330 | 7.460 | 1.5113 | 67.60 | 40.2 |
|  | Cylindrical | 53.600 | 5.827 |  |  |  |
| Second lens | Cylindrical | inf | 12.000 | 1.8325 | 20.11 | 60.4 |
| Third lens | Cylindrical | 31.100 | 8.000 | 1.9235 | 26.00 | 38.2 |
|  | Cylindrical | −88.300 | 1.260 |  |  |  |
| Fourth lens | Spherical | 29.570 | 4.520 | 1.9108 | 35.25 | 16.5 |
|  | Spherical | 66.000 | 0.220 |  |  |  |

-continued

| Lens | Surface Shape | radius (mm) | Thickness (mm) | Refractive index | Abbe Number | Mass (g) |
|---|---|---|---|---|---|---|
| Fifth lens | Spherical | 22.467 | 5.660 | 1.6968 | 55.53 | 8.5 |
| Sixth lens | Spherical | 203.000 | 3.030 | 1.6435 | 28.63 | 9.6 |
| | Spherical | 13.166 | 3.444 | | | |
| Light bar | | | 10.719 | | | |
| Seventh lens | Spherical | −15.270 | 1.580 | 1.6612 | 27.24 | 4.8 |
| Eighth lens | Spherical | 95.000 | 10.350 | 1.8040 | 46.60 | 10.2 |
| | Spherical | −27.650 | 0.200 | — | | |
| Ninth lens | Spherical | 131.600 | 4.450 | 1.8040 | 46.60 | 8.2 |
| | Spherical | −69.800 | 0.100 | | | |
| Tenth lens | Spherical | 89.800 | 9.420 | 1.8040 | 46.60 | 23.2 |
| | Spherical | inf | | | | |

In one aspect, the first lens 1 may be a large Abbe number low-dispersion lens.

In one aspect, before applying the anamorphic lens of the invention, a field of view of a given 50 mm lens with f/stop of 1.8 as the focal length is: V (vertical) 18.25 degree, H (horizontal) 27.04 degree.

After applying the anamorphic lens of embodiments of the invention, the field of view of the given 50 mm lens with f/stop of 1.8 as the focal length is: V (vertical) 18.25 degree, H (horizontal) 36.21 degree.

The angle of view of the contrast test field of view is unchanged in the vertical direction, and the angle of field deformation in the horizontal direction comparison is: 36.21/27.04=1.339.

In such an embodiment, the actual width ratio is in the range of 2.35-2.40, so the anamorphic ratio is 1.33. For example, the horizontal field of view angle is increased by 33%, so that 1.33 times anamorphic shooting may be achieved.

According to embodiments of the invention, when the anamorphic lens according to aspects of the invention is manufactured, the length of the anamorphic lens itself is less than 105 mm, with a maximum outer diameter less than 70 mm, and a mass less than 600 g. Such dimension is far smaller than similar type photographic camera interchangeable lenses, and, at the same time, it is far smaller than the professional cinema anamorphic lenses of the same specifications on the market.

In a further embodiment, no limitation is directed to the materials used for the lenses. For example, embodiments of the invention may use optical grade glasses for the lenses.

Moreover, the lens of the present application may be designed to be compatible with the bayonet of various brands of camera in the market according to the actual use's specification, so as to achieve personalized customization and universal use.

Example 2

Figure 3:
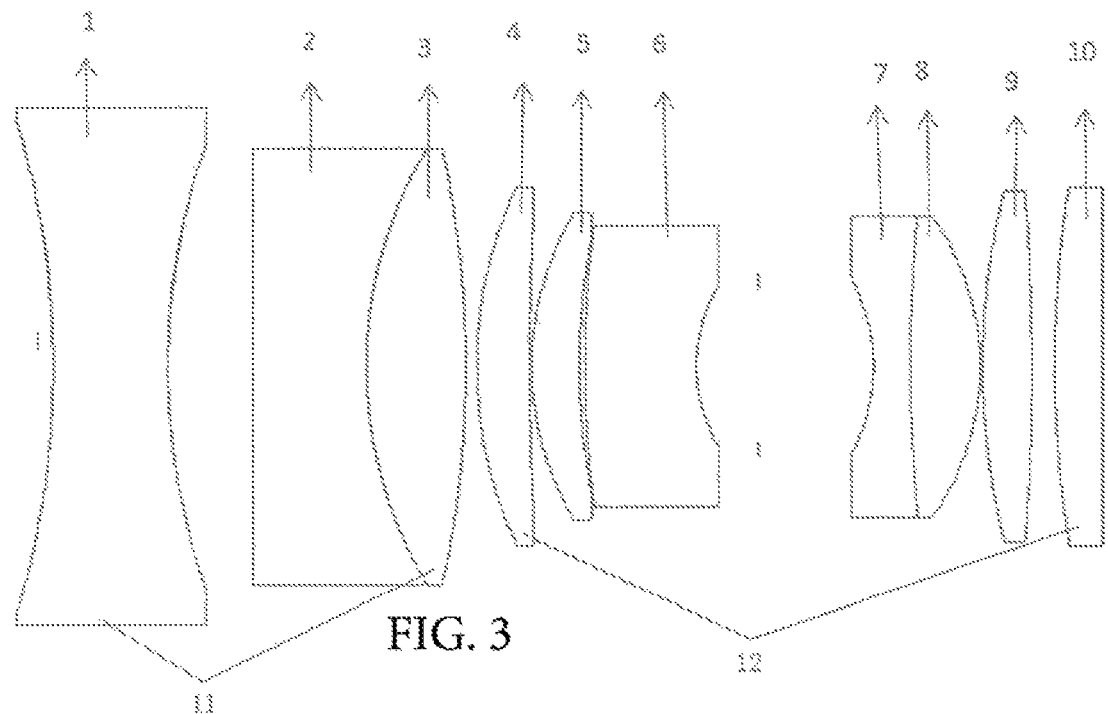
FIG. 3 is an optical structure diagram in an X direction according to a second embodiment of the present invention.
Figure 4:
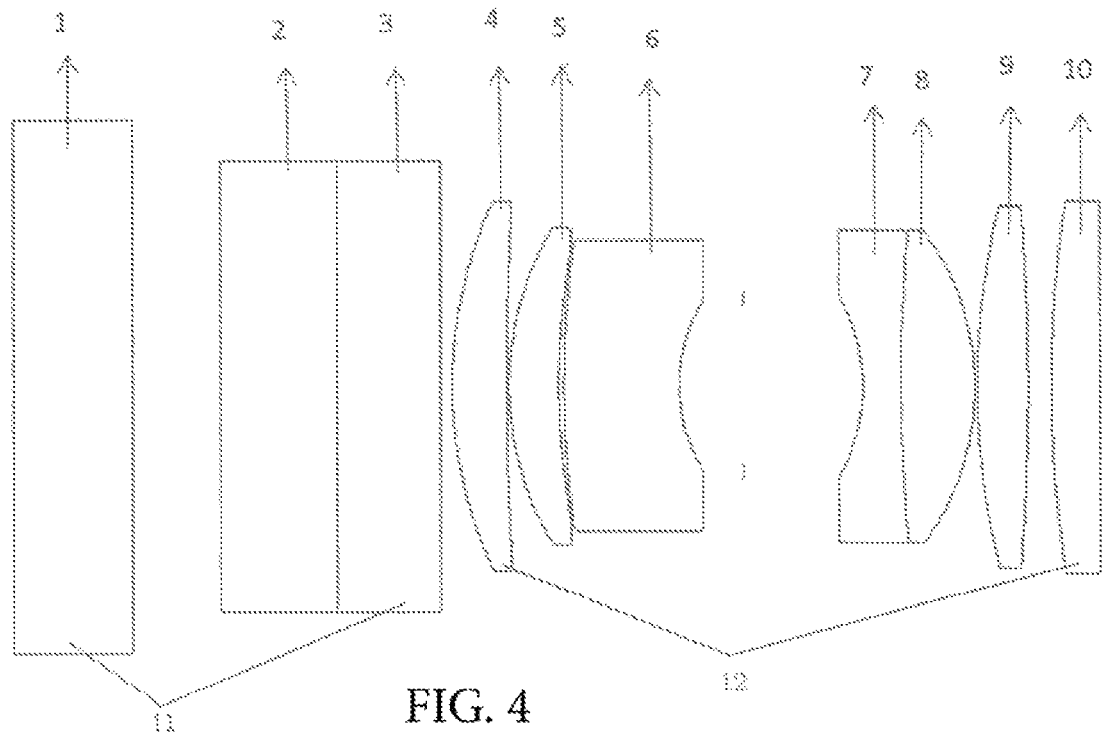
FIG. 4 is an optical structure diagram in an Y direction according to a second embodiment of the present invention.

Embodiments of the invention may provide a 50 mm focal length half-frame anamorphic lens with large aperture. In one example, Example 2 differs from the Example 1, as shown in FIG. 3 and FIG. 4, in that the combined lenses of the fifth lens 5 and the sixth lens 6 may be two independent lenses. In one aspect, the fifth lens 5 may be a positive optical power meniscus spherical lens, and the concave surface of the fifth lens 5 may face the image side. In one embodiment, the sixth lens 6 may be a negative optical power meniscus spherical lens and the concave surface of the sixth lens 6 may face the image side.

In this Example, as compared to Example 1, as the fifth lens 5 and the sixth lens 6 may be independent, the anamorphic lens may comprise 10 lenses, a group of 8.

In a further embodiment, on the basis of Example 1, the fifth lens 5 and the sixth lens 6 may be replaced. Once replaced, the optical path may be altered. As such, the lens type or shape may be adjusted accordingly to satisfy the optical power of Example 1. As such, such adjustments, while may try to distinguish over the present invention to change the lens type, shape or number, still falls within the spring and scope of the present invention.

Obviously, the foregoing embodiments may merely be an example with clear description and not as a limitation. For those of ordinary skill in the art, other different forms of changes or modifications may be made on the basis of the above description. There is no need and cannot be exhaustive to illustrate all implementations. However, the obvious changes or variations introduced thereby are still within the protection scope created by the present invention.

What is claimed is:

1. An anamorphic lens comprising:
    an anamorphic group (11) comprising cylindrical lenses;
    an imaging group (12) comprising spherical lenses, wherein the anamorphic group and the imaging group are disposed with respect from an object side to an image side;
    wherein the anamorphic group (11), from the object side to the image side, sequentially arranges a first lens (1), a second lens (2), and a third lens (3), wherein the first lens (1) comprises a negative optical power cylindrical lens, wherein the second lens (2) comprise a negative optical power cylindrical lens, and wherein the third lens (3) comprises a positive optical power cylindrical lens,
    wherein the imaging group (12), from the object side to the image side, sequentially arranges lens a fourth lens (4), a fifth lens (5), a sixth lens (6), a seventh lens (7), an eighth lens (8), a ninth lens (9), and a tenth lens (10), wherein the fourth lens (4) comprises a positive optical power meniscus spherical lens, wherein the seventh lens (7) comprises a negative optical power spherical lens, wherein the eighth lens (8) comprises a positive optical spherical lens, wherein the ninth lens (9) comprises a positive optical power biconvex spherical lens, and wherein the tenth lens (10) comprises a positive optical power meniscus spherical lens.

2. The anamorphic lens according to claim 1, wherein the first lens (1) comprises a negative optical power biconcave cylindrical lens.

3. The anamorphic lens according to claim 1, wherein the second lens (2) and the third lens (3) are configured to be laminated together.

4. The anamorphic lens according to claim 3, wherein the second lens (2) and the third lens (3) are configured to be joined together.

5. The anamorphic lens according to claim 1, wherein the seventh lens (7) and the eighth lens (8) are configured to be laminated together.

6. The anamorphic lens according to claim 1, wherein the fifth lens (5) and the sixth lens (6) are configured to be laminated together, wherein the fifth lens (5) comprises a positive optical power spherical lens and the sixth lens (6) comprises a negative optical power lens.

7. The anamorphic lens according to claim 1, wherein the fifth lens (5) and the sixth lens (6) comprise independent lenses, wherein the fifth lens (5) comprises a positive optical power meniscus spherical lens and the sixth lens (6) comprises a negative optical power meniscus spherical lens, and wherein a concave surface of the fifth lens (5) and a concave surface of the sixth lens (6) face the image side.

8. The anamorphic lens of claim 1, wherein the lenses in the anamorphic group (11) and lenses in the imaging group (12) are configured to satisfy following relationships:

$$500<abs(f_{1-3}/f_{4-10});$$

$$45<f_{4-10}<55;$$

$$1.60<f_{4-6}/f_{4-10}<2.10; \text{ and}$$

$$0.60<f_{7-10}/f_{4-10}<0.80.$$

9. The anamorphic lens of claim 8, wherein the lenses in the anamorphic group (11) and lenses in the imaging group (12) are further configured to satisfy following relationships:

$$1.10<abs(f_1/f_{2-10})<1.40;$$

$$-0.80<f_1/f_{2-3}<-0.70;$$

$$0.60<f_4/f_{4-6}<0.90;$$

$$1.0<f_{9-10}/f_{7-10}<1.60; \text{ and}$$

$$5.0<abs(f_{7-8}/f_{7-10})<9.0.$$

wherein f comprises a focal length of lenses in an X direction, where the subscript number of f represents a number of the 10th lenses of the anamorphic lens, thus $f_1$ comprises the focal length in the X direction of the first lens, and $f_{1-10}$ comprises the combined focal length of the first to 10th lenses in the X direction of ten lenses.

10. The anamorphic lens according to claim 1, wherein a length of the anamorphic lens is less than 105 mm, and a maximum outer diameter of the anamorphic lens is less than 70 mm.

11. The anamorphic lens according to claim 1, wherein the anamorphic lens has a focal length in a Y direction of 50 mm and an aperture of f/stop of 1.8.

12. The anamorphic lens according to claim 1, wherein a mass of the anamorphic lens is less than 600 gram (g).

* * * * *